US007289100B2

(12) United States Patent
Sohn et al.

(10) Patent No.: US 7,289,100 B2
(45) Date of Patent: Oct. 30, 2007

(54) METHOD AND APPARATUS FOR DRIVING LIQUID CRYSTAL DISPLAY

(75) Inventors: Min Ho Sohn, Kyounggi-do (KR); Ki Duk Kim, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 669 days.

(21) Appl. No.: 10/876,681

(22) Filed: Jun. 28, 2004

(65) Prior Publication Data

US 2005/0140616 A1 Jun. 30, 2005

(30) Foreign Application Priority Data

Dec. 29, 2003 (KR) ........................ 10-2003-099330

(51) Int. Cl.
*G09G 3/36* (2006.01)
*H04N 5/14* (2006.01)

(52) U.S. Cl. ........................................ 345/102; 348/672

(58) Field of Classification Search ................. 345/102
See application file for complete search history.

(56) References Cited

U.S. PATENT DOCUMENTS

| | | | | |
|---|---|---|---|---|
| 6,795,053 | B1 * | 9/2004 | Funamoto et al. | 345/102 |
| 7,119,786 | B2 * | 10/2006 | Cui | 345/102 |
| 2002/0070914 | A1 * | 6/2002 | Bruning et al. | 345/102 |
| 2003/0001815 | A1 * | 1/2003 | Cui | 345/102 |
| 2003/0222884 | A1 * | 12/2003 | Ikeda et al. | 345/589 |
| 2005/0057485 | A1 * | 3/2005 | Diefenbaugh | 345/102 |

* cited by examiner

*Primary Examiner*—Vu Le
*Assistant Examiner*—Eli M Sheets
(74) *Attorney, Agent, or Firm*—McKenna Long & Aldridge LLP

(57) ABSTRACT

A method of driving a liquid crystal display includes arranging an externally provided first data into a histogram for each frame, producing a second data having an expanded contrast using the histogram, determining a control value by extracting a peak value at a position where brightness components are concentrated in a distribution, and controlling a brightness of a back light in accordance with a gray level of the control value.

30 Claims, 9 Drawing Sheets

METHOD AND APPARATUS FOR DRIVING LIQUID CRYSTAL DISPLAY

This application claims the benefit of Korean Patent Application No. P2003-99330 filed in Korea on Dec. 29, 2003, which is hereby incorporated by reference.

BACKGROUND OF THE INVENTION

1. Field of the Invention

This invention relates to a liquid crystal display, and more particularly to a driving method and apparatus for a liquid crystal display having a picture with a contrast ratio.

2. Description of the Related Art

Generally, a liquid crystal display (LCD) controls light transmittance of liquid crystal cells in accordance with video signals to thereby display a picture. Such an LCD has been implemented in an active matrix structure having a switching device associated with each cell. LCDs have been applied to display devices such as computer monitors, office equipments, cellular phones, and the like. The switching device for the active matrix LCD mainly includes a thin film transistor (TFT).

FIG. 1 is a schematic block diagram of a configuration of a driving apparatus for a liquid crystal display in accordance with related art. Referring to FIG. 1, the related art LCD driving apparatus includes a liquid crystal display panel 2 having an m×n number of liquid crystal cells Clc arranged in a matrix structure, an m number of data lines D1 to Dm and an n number of gate lines G1 to Gn crossing each other and thin film transistors TFT provided adjacent to the crossings, a data driver 4 that applies data signals to the data lines D1 to Dm of the liquid crystal display panel 2, a gate driver 6 that applies scanning signals to the gate lines G1 to Gn, a gamma voltage supplier 8 that supplies the data driver 4 with gamma voltages, a timing controller 10 that controls the data driver 4 and the gate driver 6 using synchronizing signals from a system 20, a direct current to direct current converter 14, hereinafter "DC/DC converter", that generates voltages supplied to the liquid crystal display panel 2 using a voltage from a power supply 12, and an inverter 16 that drives a back light 18. The system 20 applies a plurality of signals to the timing controller. The applied signals include vertical/horizontal signals Vsync and Hsync, clock signals DCLK, a data enable signal DE and R, G and B data.

The liquid crystal display panel 2 includes a plurality of liquid crystal cells Clc arranged in a matrix structure at crossings of the data lines D1 to Dm and the gate lines G1 to Gn. The thin film transistor TFT provided at each liquid crystal cell Clc applies a data signal from each data line D1 to Dm to the liquid crystal cell Clc in response to a scanning signal from the gate line G. Further, each liquid crystal cell Clc is provided with a storage capacitor Cst. The storage capacitor Cst is provided between a pixel electrode of the liquid crystal cell Clc and a pre-stage gate line to thereby keep constant a voltage of the liquid crystal cell Clc. Alternatively, the storage capacitor Cst can be provided between the pixel electrode of the liquid crystal cell Clc and a common electrode line.

The gamma voltage supplier 8 applies a plurality of gamma voltages to the data driver 4. The data driver 4 converts digital video data R (Red), G (Green) and B (Blue) into analog gamma voltages (i.e., data signals) corresponding to gray level values in response to a control signal CS from the timing controller 10, and applies the analog gamma voltages to the data lines D1 to Dm.

The gate driver 6 sequentially applies a scanning pulse to the gate lines G1 to Gn in response to a control signal CS from the timing controller 10 to thereby select horizontal lines of the liquid crystal display panel 2 supplied with the data signals.

The timing controller 10 generates the control signals CS that controls the gate driver 6 and the data driver 4 using the vertical/horizontal synchronizing signals Vsync and Hsync and the clock signal DCLK input from the system 20. Herein, the control signal CS that controls the gate driver 6 comprises a gate start pulse GSP, a gate shift clock GSC and a gate output enable signal GOE, etc. Further, the control signal CS that controls the data driver 4 comprises a source start pulse SSP, a source shift clock SSC, a source output enable signal SOE and a polarity signal POL. Etc. The timing controller 10 re-aligns the R, G and B data from the system 20. The timing controller applies the re-aligned R, G and B data to the data driver 4.

The DC/DC converter 14 boosts or drops the level of a voltage input from the power supply 12 from a value of 3.3V. The DC/DC converter supplies the converted voltage to the liquid crystal display panel 2. Such a DC/DC converter 14 generates a gamma reference voltage, a gate high voltage VGH, a gate low voltage VGL and a common voltage Vcom, etc.

The inverter 16 drives the back light 18 to the back light 18 by applying a driving voltage (or driving current). The back light 18 generates light in accordance with the driving voltage (or driving current) from the inverter 16 and applies the generated light to the liquid crystal display panel 2.

To display a vivid image on the liquid crystal display panel 2 driven in this manner, a distinct contrast between brightness and darkness of a data must be represented. However, since the related art does not disclose a method of rendering a distinct contrast of the data, it is difficult to display a vivid image using the related art liquid crystal display panel. Furthermore, since the related art back light 18 produced a constant brightness level irrespective of the input data, it is difficult to display a dynamic and fresh image using the related art back light unit.

SUMMARY OF THE INVENTION

Accordingly, the present invention is directed to a method and apparatus for driving liquid crystal display that substantially obviate one or more of the problems due to limitations and disadvantages of the related art.

An object of the present invention to provide a method for driving a liquid crystal display having expanded contrast ratio in accordance with an input data.

Another object of the present invention to provide an apparatus for driving a liquid crystal display with expanded contrast ratio in accordance with an input data.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, the method of driving a liquid crystal display includes arranging an externally provided first data into a histogram for each frame, producing a second data having an expanded contrast using the histogram, determining a control value by extracting a peak value at a position where brightness components are concentrated in a distribution, and controlling a brightness of a back light in accordance with a gray level of the control value.

In another aspect, the method of driving a liquid crystal display includes arranging externally provided data into a histogram for each frame, determining a control value which includes extracting a peak value at a position where brightness components are concentrated in a distribution, and controlling a brightness of a back light in accordance with a gray level of the control value.

In another aspect, the driving apparatus for a liquid crystal display includes a brightness/color separator that extracts brightness components from a first data, a histogram analyzer that converts the brightness components into a histogram for each frame, a data processor that produces a second data having an expanded contrast using the histogram, a control value extractor that extracts as a control value a peak value at a central part of the histogram, and a back light controller that controls brightness of a back light in response to the control value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings.

DETAILED DESCRIPTION OF THE PREFERRED EMBODIMENT

Reference will now be made in detail to the preferred embodiments of the present invention, examples of which are illustrated in the accompanying drawing.

Figure 1:
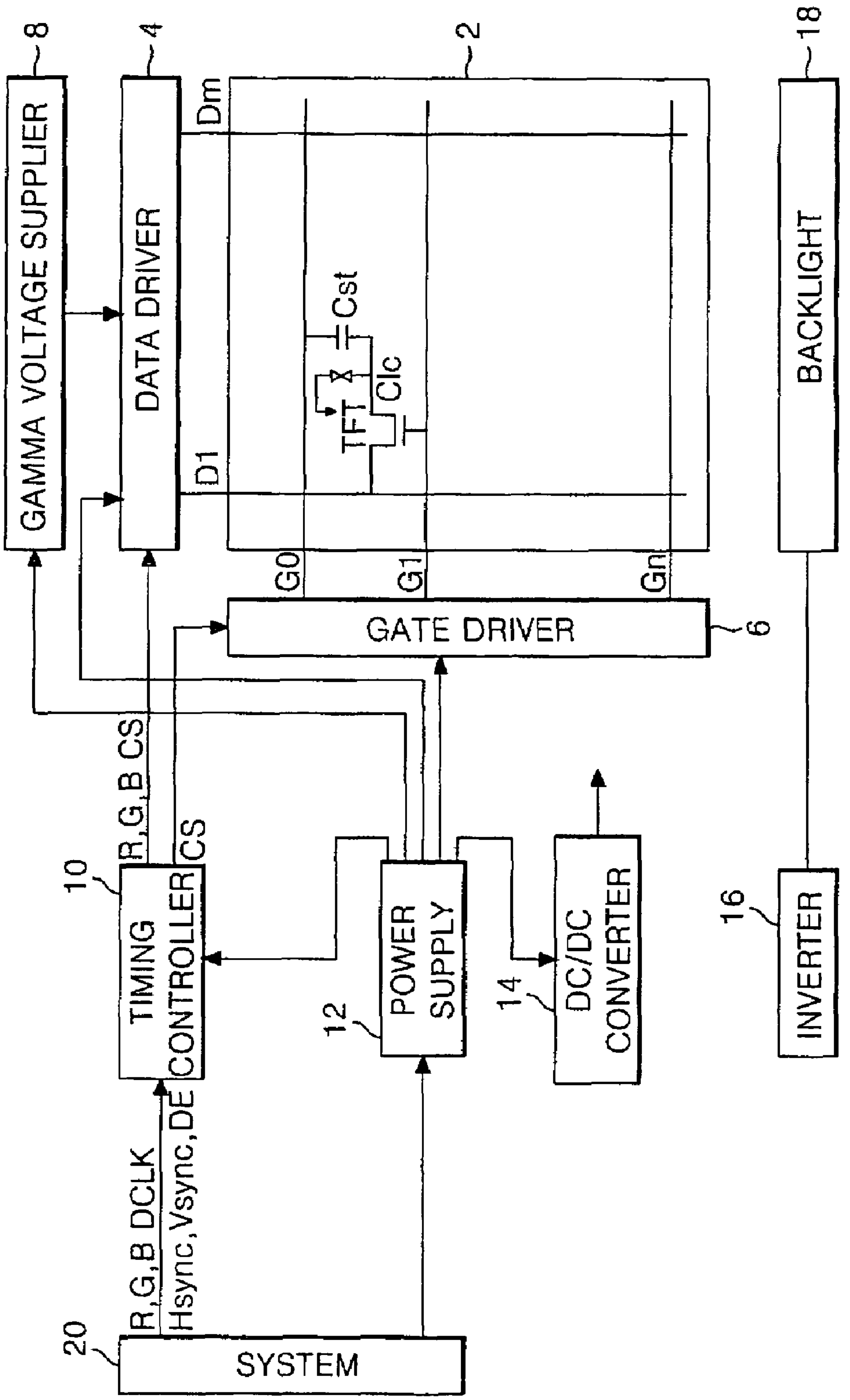
FIG. 1 RELATED ART
FIG. 1 is a schematic block diagram of a configuration of a driving apparatus for a liquid crystal display in accordance with related art.
Figure 2:
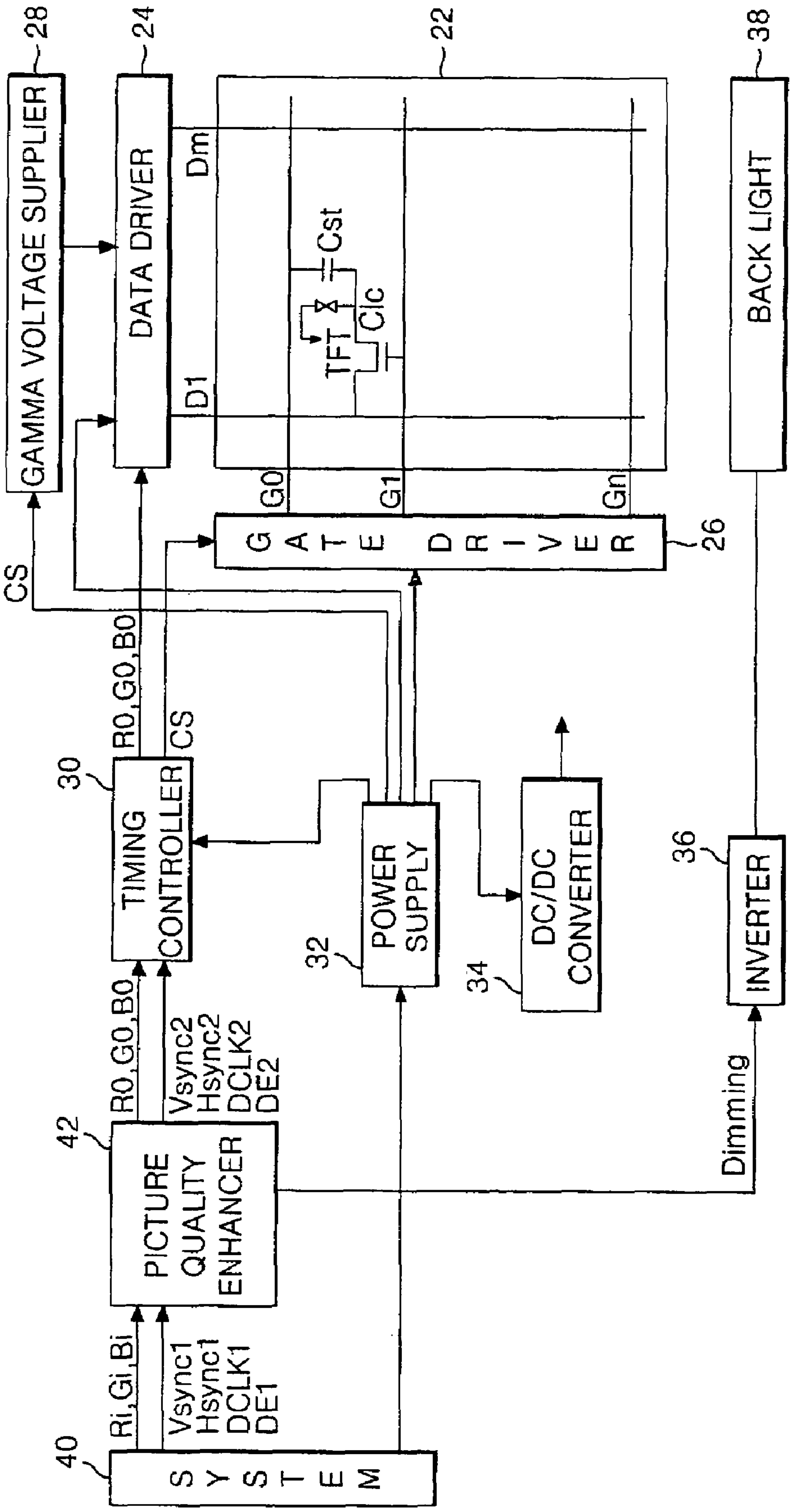
FIG. 2 is a schematic block diagram of a configuration of an exemplary driving apparatus for a liquid crystal display according to an embodiment of the present invention.

FIG. 2 is a schematic block diagram of a configuration of an exemplary driving apparatus for a liquid crystal display according to an embodiment of the present invention. Referring to FIG. 2, the LCD driving apparatus according to the above-mentioned embodiment of the present invention includes a liquid crystal display panel 22 having an m×n number of liquid crystal cells Clc arranged in a matrix structure. The LCD includes an m number of data lines D1 to Dm and an n number of gate lines G1 to Gn crossing each other. Thin film transistors (TFT) are adjacent to crossings of the data lines and the gate lines. The LCD includes a data driver 24 that applies data signals to the data lines D1 to Dm of the liquid crystal display panel 22 and a gate driver 26 that applies scanning signals to the gate lines G1 to Gn. The LCD further includes a gamma voltage supplier 28 for supplying the data driver 24 with gamma voltages. The LCD also includes a timing controller 30 that controls the data driver 24 and the gate driver 26 using a second synchronizing signal from a picture quality enhancer 42. The LCD also has a DC/DC converter 34 that generates voltages supplied to the liquid crystal display panel 22 using a voltage from a power supply 32. In the LCD, an inverter 36 that drives a back light unit 38. A picture quality enhancer 42 selectively emphasizes a contrast of an input data into the LCD and applies a brightness control signal Dimming corresponding to the input data to the inverter 36. A system 40 applies first vertical/horizontal signals Vsync1 and Hsync1, a first clock signal DCLK1, a first data enable signal DE1 and first data Ri, Gi and Bi to the picture quality enhancer 42.

The liquid crystal display panel 22 includes a plurality of liquid crystal cells Clc arranged in a matrix arrangement. The liquid crystal cells are positioned at the crossings between the data lines D1 to Dm and the gate lines G1 to Gn. The thin film transistor TFT provided in each liquid crystal cell Clc applies a data signal from one of the data lines D1 to Dm to the liquid crystal cell Clc in response to a scanning signal from one of the gate lines G0 to Gn. Further, each liquid crystal cell Clc is provided with a storage capacitor Cst. The storage capacitor Cst is provided between a pixel electrode of the liquid crystal cell Clc and a pre-stage gate line. Alternatively, the storage capacitor can be provided between the pixel electrode of the liquid crystal cell Clc and a common electrode line to keep constant a voltage of the liquid crystal cell Clc.

The gamma voltage supplier 28 applies a plurality of gamma voltages to the data driver 24. The data driver 24 converts digital video data Ro, Go and Bo into analog gamma voltages (i.e., data signals) corresponding to gray level values in response to a control signal CS from the timing controller 30, and applies the analog gamma voltages to the data lines D1 to Dm.

The gate driver 26 sequentially applies a scanning pulse to the gate lines G1 to Gn in response to a control signal CS from the timing controller 30. Thereby, the gate driver selects horizontal lines of the liquid crystal display panel 22 to be supplied with the data signals.

The timing controller 30 generates the control signals CS that controls the gate driver 26 and the data driver 24 using second vertical/horizontal synchronizing signals Vsync2 and Hsync2 and a second clock signal DCLK2 input from the picture quality enhancer 42. Herein, the control signal CS that controls the gate driver 26 comprises a gate start pulse GSP, a gate shift clock GSC and a gate output enable signal GOE, etc. Further, the control signal CS that controls the data driver 24 comprises a source start pulse SSP, a source shift clock SSC, a source output enable signal SOE and a polarity signal POL. Etc. The timing controller 30 re-aligns second data Ro, Go and Bo from the picture quality enhancer 42. The timing controller 30 applies the re-aligned Ro, Go and Bo data to the data driver 24.

The DC/DC converter 34 boosts or drops the level of a voltage input from the power supply 32 from a value of 3.3V. The DC/DC converter supplies the converted voltage to the liquid crystal display panel 22. Such a DC/DC converter 14 generates a gamma reference voltage, a gate high voltage VGH, a gate low voltage VGL and a common voltage Vcom.

The inverter 36 applies a driving voltage corresponding to the brightness control signal Dimming from the picture quality enhancer 42 to the back light 38. In other words, the driving voltage applied from the inverter 36 to the back light 38 is determined by the brightness control signal Dimming from the picture quality enhancer 42. The back light 38 applies light to the liquid crystal display panel 22 in accordance with the driving voltage from the inverter 36.

Alternatively, the inverter 36 can apply a driving current corresponding to the brightness control signal Dimming from the picture quality enhancer 42 to the back light 38. In this case, the driving current applied from the inverter 36 to the back light 38 is determined by the brightness control signal Dimming from the picture quality enhancer 42. Thus, the back light 38 applies light to the liquid crystal display panel 22 in accordance with the driving current from the inverter 36.

The picture quality enhancer 42 extracts brightness components for each frame using the first data Ri, Gi and Bi from the system 40, and generates second data Ro, Go and Bo. The second data Ro, Go and Bo is obtained by changing the gray level values of the first data Ri, Gi and Bi in accordance with the extracted brightness components for each frame. In this case, the picture quality enhancer 42 generates the second data Ro, Go and Bo such that a contrast is expanded with respect to the input data Ri, Gi and Bi.

The picture quality enhancer 42 generates a brightness control signal Dimming corresponding to the extracted brightness components. The picture quality enhancer 42 applies the brightness control signal to the inverter 36. Specifically, the picture quality enhancer 42 extracts from the brightness components a control value for controlling the back light, and generates the brightness control signal Dimming using the extracted control value. Herein, the picture quality enhancer 42 divides the brightness of the back light corresponding to gray levels of the brightness components into at least two regions, and generates the brightness control signal Dimming such that region selection corresponds to the control value.

The picture quality enhancer 42 generates second vertical/horizontal synchronizing signals Vsync2 and Hsync2, a second clock signal DCLK2 and a second data enable signal DE2 using the first vertical/horizontal synchronizing signals Vsync1 and Hsync1, the first clock signal DCLK1 and the first data enable signal DE1 input from the system 40. Herein, the second data enable signal DE2 is synchronized with the second data Ro, Go and Bo.

Figure 3:
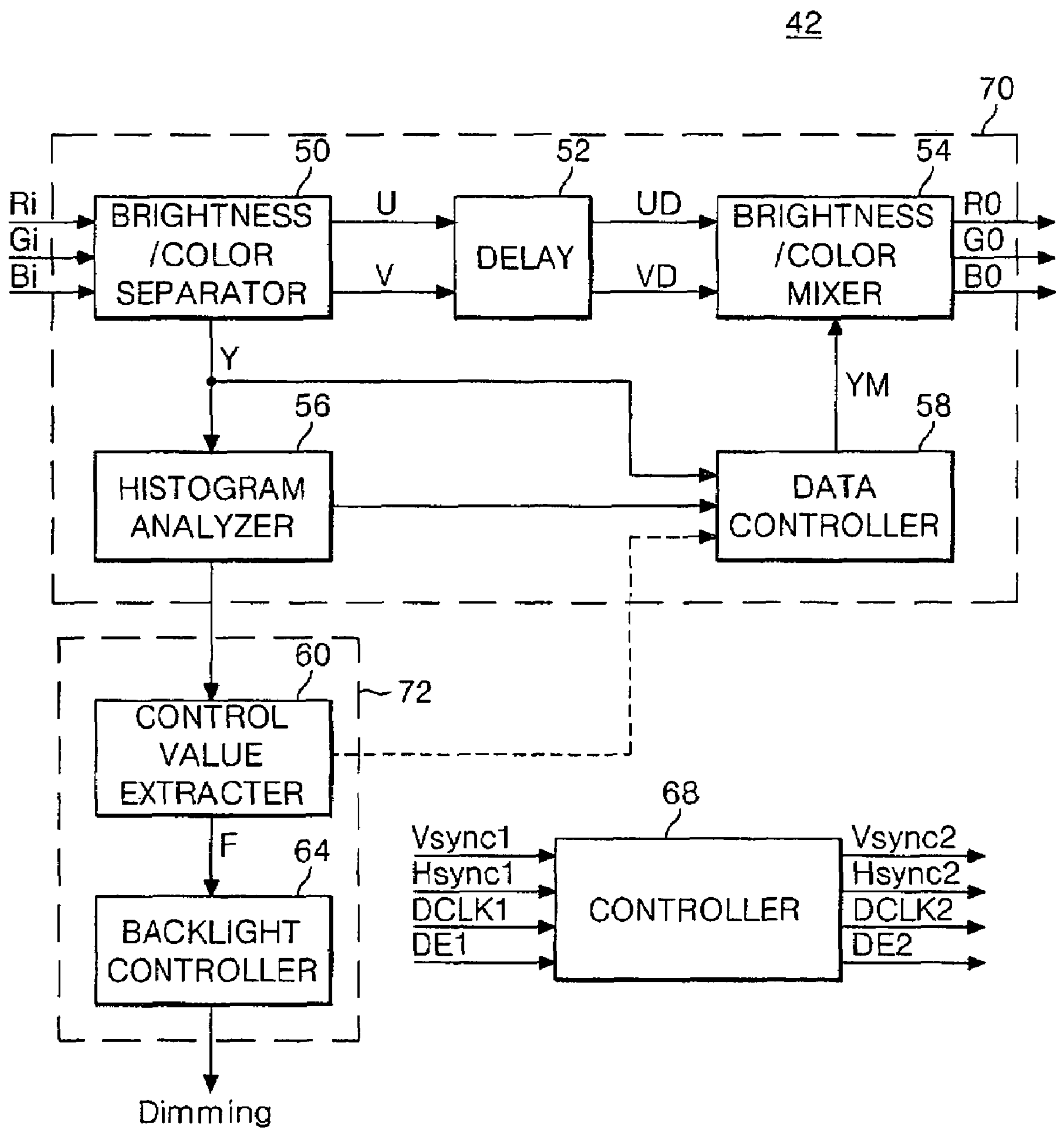
FIG. 3 is a detailed block diagram of the exemplary picture quality enhancer shown in FIG. 2.

FIG. 3 is a detailed block diagram of the exemplary picture quality enhancer shown in FIG. 2. As shown in FIG. 3, the picture quality enhancer 42 includes an image signal modulator 70, a back light controller 72 and a control unit 68. The image signal modulator 70 generates the second data Ro, Go and Bo using the first data Ri, Gi and Bi. The back light controller 72 generates the brightness control signal Dimming under control of the image signal modulator 70. The control unit 68 generates the second vertical/horizontal synchronizing signals Vsync2 and Hsync2, the second clock signal DCLK2 and the second enable signal DE2.

The image signal modulator 70 extracts brightness components Y from the first data Ri, Gi and Bi. The image signal modulator 70 generates second data Ro, Go and Bo in which a contrast is partially emphasized based on the extracted brightness components Y. To this end, the image signal modulator 70 includes a brightness/color separator 50, a delay 52, a brightness/color mixer 54, a histogram analyzer 56 and a data controller 58.

The brightness/color separator 50 separates the first data Ri, Gi and Bi into brightness components Y and chrominance components U and V. Herein, the brightness components Y and the chrominance components U and V are obtained by the following equations:

$$Y=0.229\times Ri+0.587\times Gi+0.114\times Bi \tag{1}$$

$$U=0.493\times(Bi-Y) \tag{2}$$

$$V=0.887\times(Ri-Y) \tag{3}$$

Figure 4:
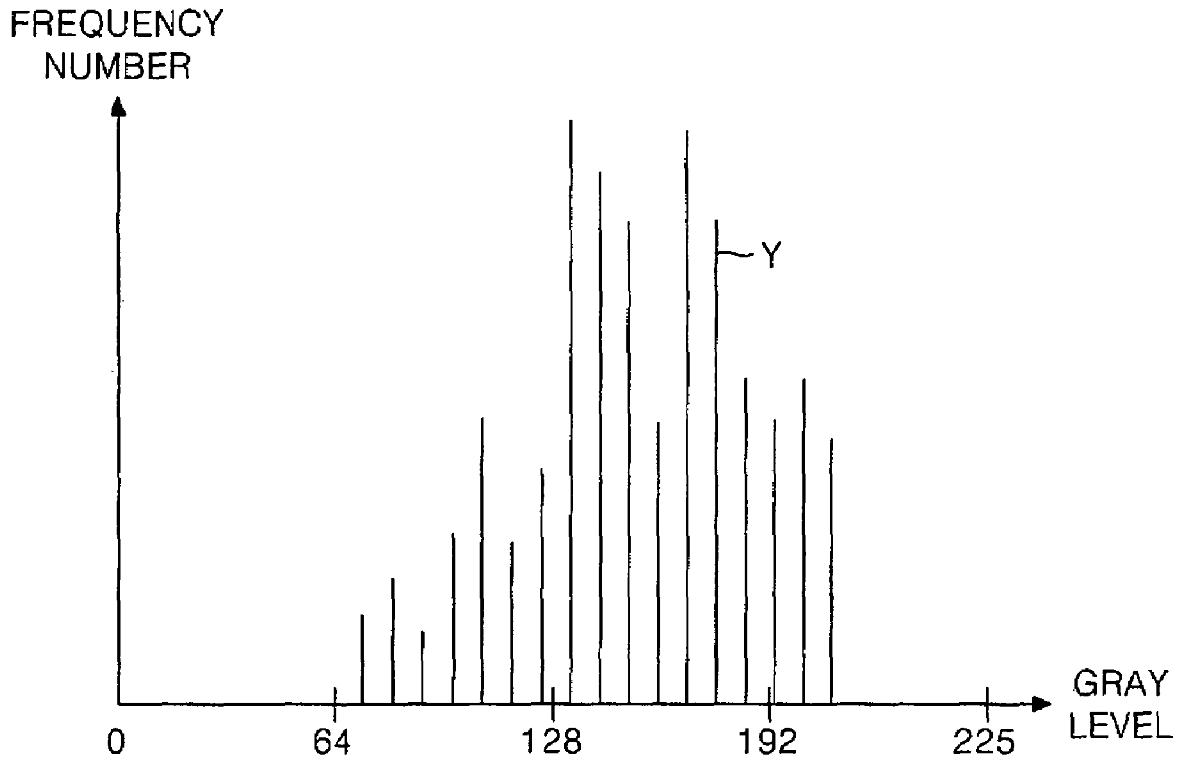
FIG. 4 is a graph of a sample histogram analyzed by the exemplary histogram analyzer shown in FIG. 3.

FIG. 4 is a graph of a sample histogram analyzed by the exemplary histogram analyzer shown in FIG. 3. The histogram analyzer 56 divides the brightness components Y of each frame into gray levels for that frame. In other words, the histogram analyzer 56 arranges the brightness components Y of each frame in accordance with the gray levels, thereby obtaining a histogram as shown in FIG. 4. Herein, the shape of the histogram varies in accordance with the brightness components of the first data Ri, Gi and Bi.

The data controller 58 generates modulated brightness components YM having an emphasized contrast using the analyzed histogram from the histogram analyzer 56. Specifically, the data controller 58 can generate modulated brightness components YM using various methods. Exemplary schemes that can be used by the above-mentioned data controller 58 as modulating methods for expanding image contrast are disclosed in Korean Patent Applications Nos. 2003-036289, 2003-040127, 2003-041127, 2003-80177, 2003-81171, 2003-81172, 2003-81173 and 2003-81175, which are pre-filed by Applicants and are hereby incorporated herein. Alternatively, the data controller 58 can generate the modulated components YM having an emphasized contrast using a well-known method. On the other hand, the data controller 58 can generate the modulated brightness components YM with reference to a control value from the control value extractor 60.

The delay 52 delays chrominance components U and V until the brightness components YM modulated by the data controller 58 are produced. Further, the delay 52 applies the delayed chrominance components VD and UD to the brightness/color mixer 54 in synchronization with the modulated brightness components YM.

The brightness/color mixer 54 generates second data Ro, Go and Bo using the modulated brightness components YM and the delayed chrominance components UD and VD. Herein, the second data Ro, Go and Bo are obtained by the following equations:

$$Ro=YM+0.000\times UD+1.140\times VD \tag{4}$$

$$Go=YM-0.396\times UD-0.581\times VD \tag{5}$$

$$Bo=YM+2.029\times UD+0.000\times VD \tag{6}$$

Since the second data Ro, Go and Bo obtained by the brightness/color mixer 54 have been produced using modulated brightness components YM with an expanded contrast, they have more expanded contrast than the first data Ri, Gi and Bi. The second data Ro, Go and Bo are applied to the timing controller 30.

The controller unit 68 receives the first vertical/horizontal synchronizing signals Vsync1 and Hsync1, the first clock signal DCLK1 and the first data enable signal DE1 from the system 40. Further, the controller 68 generates the second vertical/horizontal synchronizing signals Vsync2 and Hsync2, the second clock signal DCLK2 and the second data enable signal DE2 in synchronization with the second data Ro, Go and Bo, and applies the generated signals Vsync2, Hsync2, DCLK2 and DE2 to the timing controller 30. The back light controller 72 extracts a control value from the histogram analyzer 56, and generates a brightness control signal Dimming using the extracted control value. Herein, the control value controls a change in brightness of the back light 38. A peak value within a region containing a concentration of the brightness components is selected as the control value. Specifically, a gray level of the peak value is selected as the control value.

Figure 5:
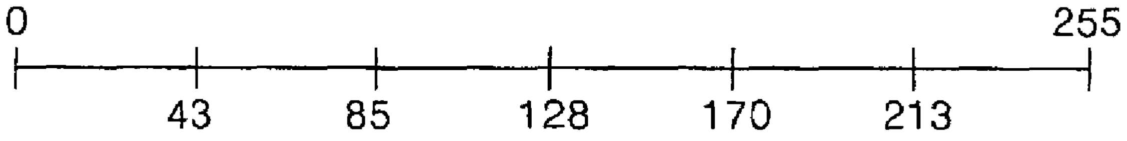
FIG. 5 depicts a plurality of regions divided for the purpose of controlling brightness of the back light by the exemplary back light controller shown in FIG. 3.

FIG. 5 depicts a plurality of regions divided for the purpose of controlling brightness of the back light by the exemplary back light controller shown in FIG. 3. The back light controller 72 includes a control value extractor 60 and a back light control 64. As shown in FIG. 5, the back light control 64 divides gray levels of the brightness components Y into a plurality of areas, and controls the back light 38 in such a manner that each area corresponds to a different brightness of light. In other words, the back light control 64 grasps a gray level of the control value, and generates a brightness control signal Dimming that corresponds to the area which contains the control value.

The control value extractor 60 extracts a control value from the histogram analyzer 56 to apply the control value to the back light control 64. Herein, the control value extractor 60 extracts a control value that corresponds to a characteristic of the histogram. In other words, the present control value extractor 60 selects a peak value at a position having a high concentration of the brightness components. If a peak value at the position containing a concentration of the brightness components is selected as the control value, then the brightness of picture can be adjusted in correspondence with the brightness of the data.

The control value can be selected as the most-frequent value, which is the value having the highest frequency of occurrence in the histogram. However, if the most-frequent value is selected as the control value, then an image with brightness characteristic contrary to the desired brightness from a specific image is displayed causing a deterioration of display quality. For instance, when the moon rises at a dark background, if a most-frequent value is selected as the control value, then total brightness (i.e., gray levels corresponding to the moon) is highly controlled to thereby fail to display a desired image. Accordingly, the present control value extractor 60 selects a peak value at a position where the brightness components are highly concentrated as the control value, thereby always displaying a desired brightness of image on the liquid crystal display panel 22.

Figure 6:
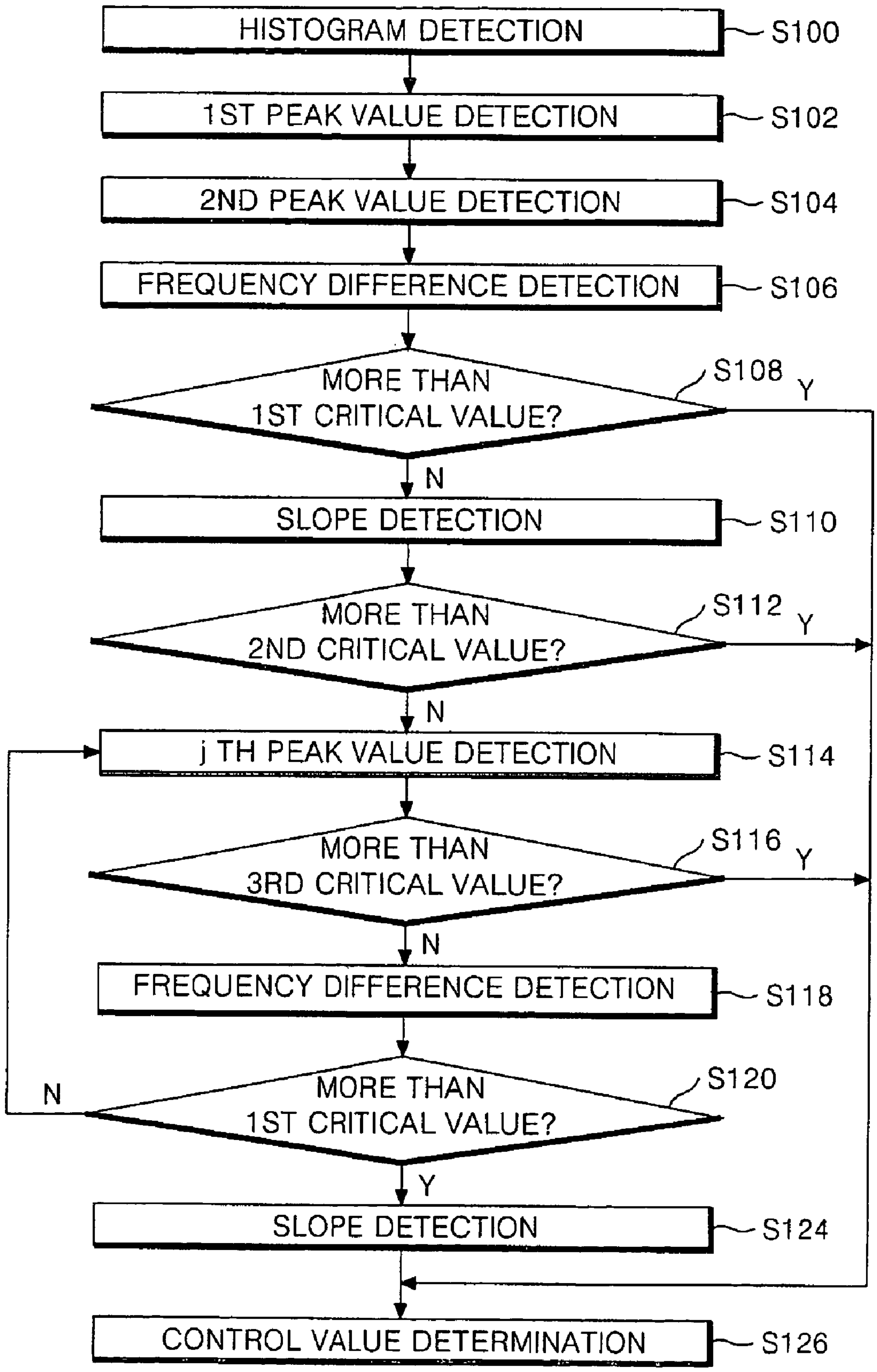
FIG. 6 is a flow chart representing a process of extracting a control value from the exemplary control value extractor shown in FIG. 3.

FIG. 6 is a flow chart representing a process of extracting a control value from the exemplary control value extractor shown in FIG. An operation procedure of the control value extractor 60 will be described in detail with reference to the flow chart depicted in FIG. 6. Referring to FIG. 6, firstly, at step S100, the histogram analyzer 56 arranges the brightness components Y for each frame in order of gray levels, to thereby generate a histogram. In this case, the generated brightness components varies in correspondence with the first data Ri, Gi and Bi. For instance, at step S100, a histogram as shown in FIG. 7A can be generated.

Figure 7A:
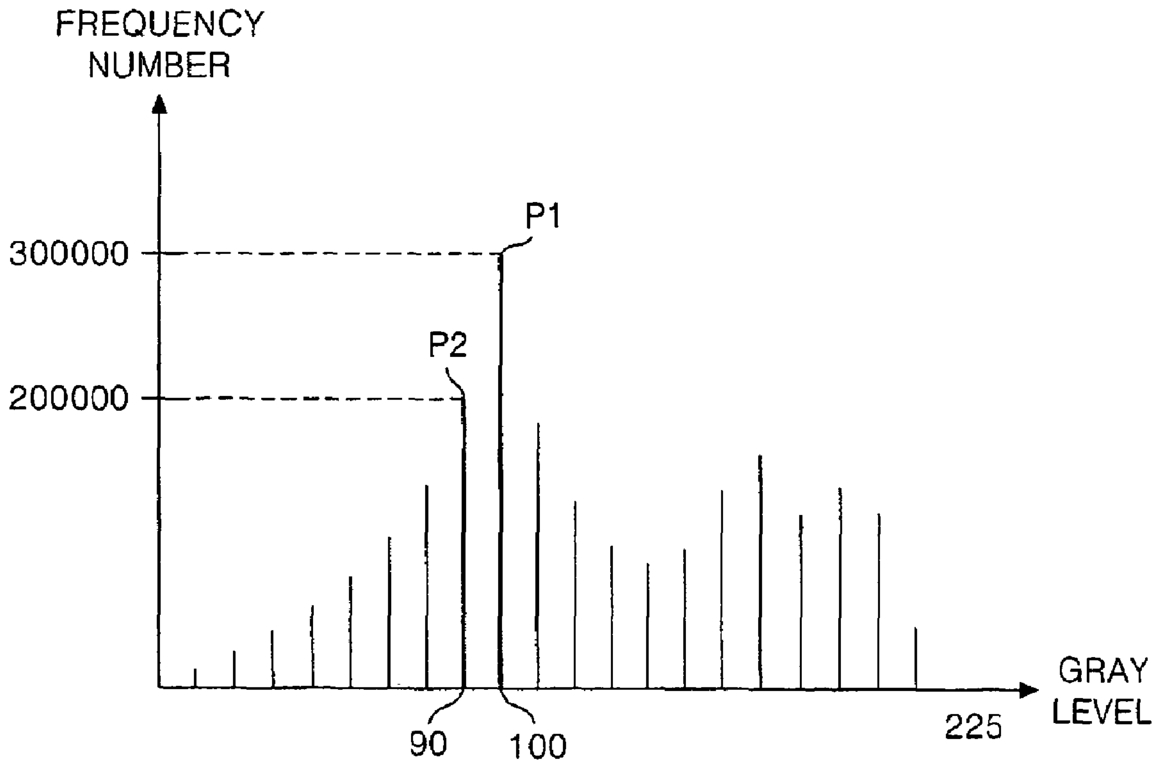
FIG. 7A to FIG. 7C are explanatory graphs of histograms illustrating a process of extracting a control value in FIG. 6.
Figure 7B:
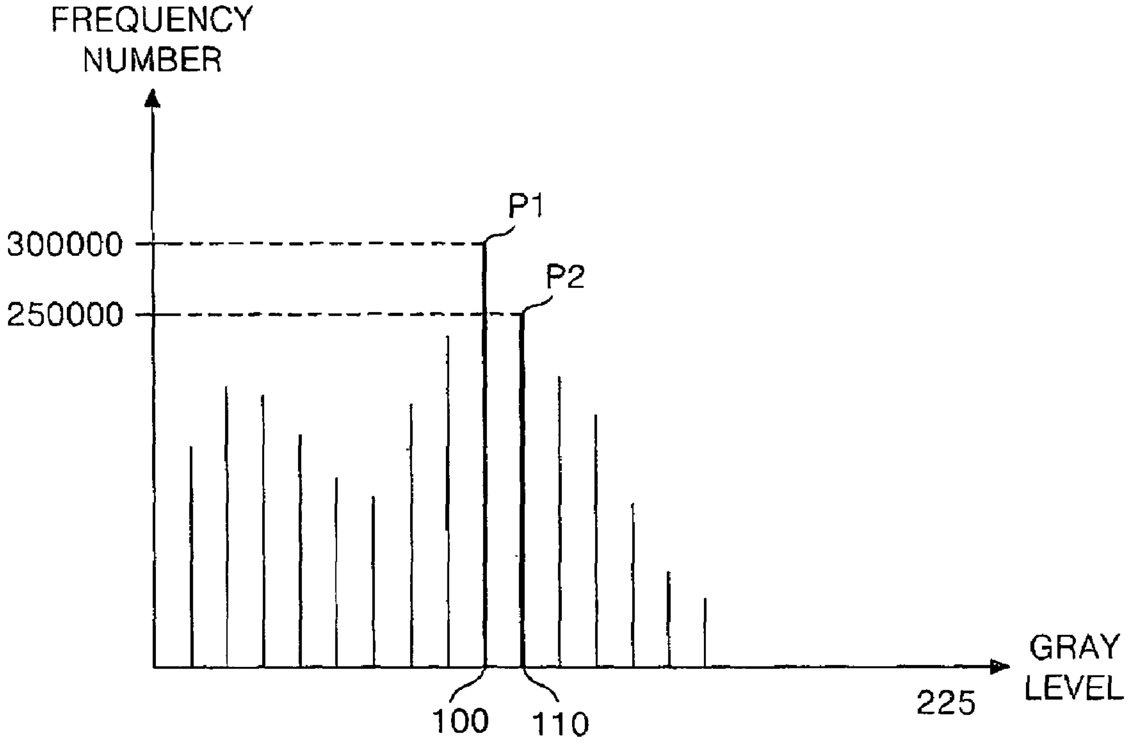
Figure 7C:
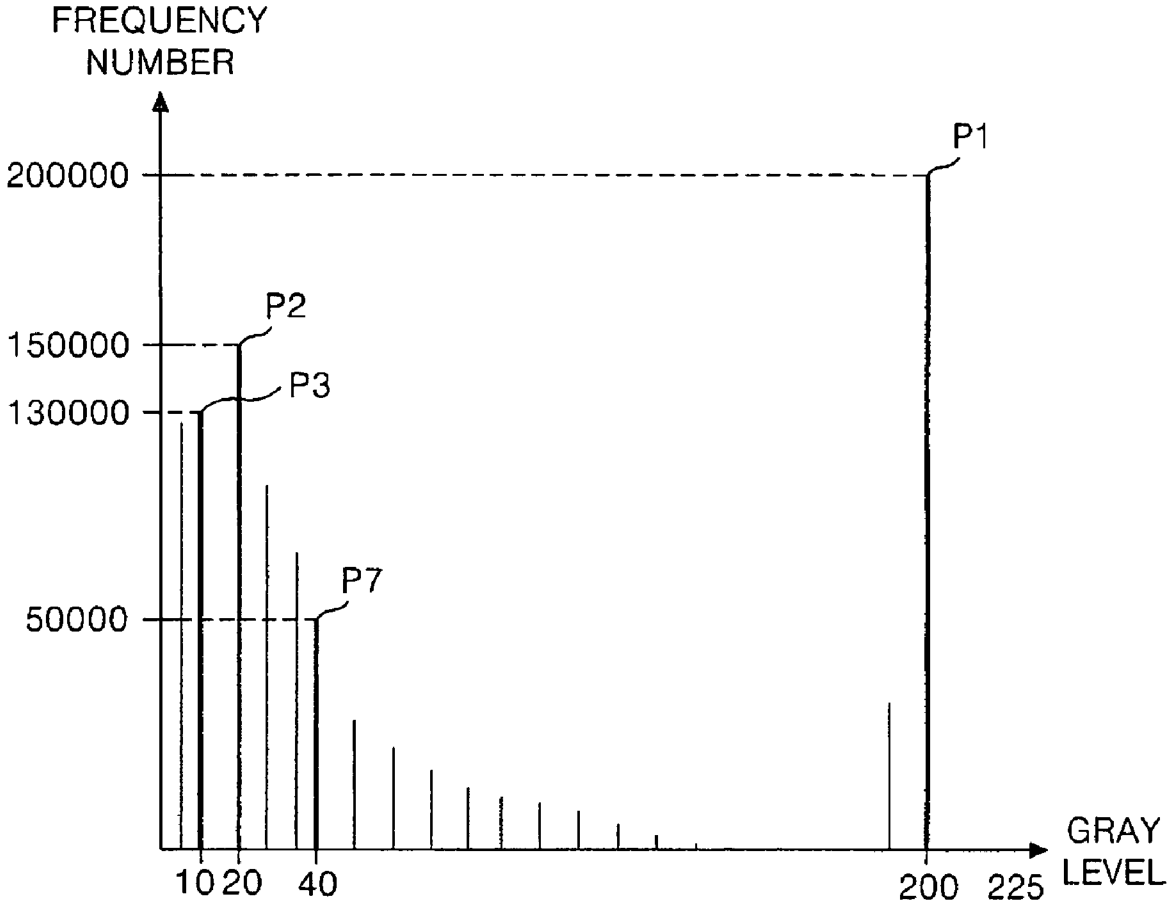

FIG. 7A to FIG. 7C are explanatory graphs of histograms illustrating a process of extracting a control value in FIG. 6. In FIG. 7A, the vertical axis represents a frequency of occurrence while the horizontal axis does a gray level. The frequency of occurrence in the horizontal axis is determined by the display resolution of the liquid crystal display panel 22. For example, if the liquid crystal display panel 22 has a display resolution of 1024×768, the highest value of the frequency of occurrence in the vertical axis is determined to be 983040.

If a histogram has been generated at step S100, then the control value extractor 60 detects a first peak value P1 from the histogram at step S102. The first peak value P1 is a value having the highest frequency of occurrence in the histogram (i.e., a most-frequent value). In FIG. 7A, the first peak value P1 is selected as 300000. At step S104, the control value extractor 60 detects a second peak value P2. The second peak value P2 is a value having the second highest frequent of occurrence in the histogram. In FIG. 7A, the second peak value P2 is selected as 2000000.

At step S106, the control value extractor 60 having detected the first and second peak values P1 and P2 generates a normalized frequency difference between the first peak value P1 and the second peak value P2. The normalized frequency difference is generated by calculating the difference between the second peak value P2 and the first peak value P1 and dividing the calculated difference by the second peak value P2. In other words, the frequency difference generated at step 106 is calculated by subtracting the low value P2 from the high value P1 and then dividing the subtracted value by the low value P2. For example, at step S106, a value subtracted, by the second peak value P2, from the first peak value P1 is set to 100000, and the frequency difference results in 0.5 if the subtracted value is divided by the second peak value P2.

At step S108, the control value extractor 60 checks whether the frequency difference generated at step 106 exceeds a first threshold value. Herein, the first threshold value is set to 0.5 or more. More specifically, the frequency difference obtained in step 106 is a value representing a normalized frequency difference between the first peak value P1 and the second peak value P2. Experimentally, if the frequency difference between the first peak value P1 and the second peak value P2 is set to 0.5 or more, then most of the brightness components are positioned at the first peak value P1. Hereinafter, it will be assumed that the first threshold value should be set to 0.5.

Since the frequency difference is set higher than the first threshold value at step 108, the control value extractor 60 determines 100 as the control value at step 126. The control value is the gray level associated with the first peak value. Thereafter, the control value determined at step S126 is applied to the back light controller 64 and the data controller 58. The back light controller 64 generates a brightness control signal Dimming such that a light having brightness corresponding to the determined control value can be produced. The data controller 58 generates the modulated brightness components YM such that a contrast ratio can be improved in accordance with the control value.

In an embodiment of the present invention, a frequency difference between the first peak value P1 and the second peak value P2 is detected, and a gray level of the first peak value P1 is set to a control value when the frequency difference exceeds the first threshold value. Accordingly, in the above-referenced embodiment the present invention, it becomes possible to select the first peak value having the highest brightness as the control value, thereby adjusting brightness in correspondence with a data.

Hereinafter, another embodiment of the present invention will be described in reference to FIG. 6 and FIG. 7B. An explanation of FIG. 6 will be briefly made in conjunction with the forgoing related descriptions. Referring to FIG. 6 and FIG. 7B, firstly, at step S100, a histogram as shown in FIG. 7B is generated by the histogram analyzer 56. If the histogram has been generated at step 100, then the control value extractor 60 extracts a first peak value P1 and a second peak value P2 from the histogram at steps S102 and S104. In FIG. 7B, the first peak value P1 is selected as 300000 while the second peak value P2 is selected as 250000. The control value extractor 60 having detected the first and second peak values P1 and P2 at steps S102 and S104 calculates a frequency difference between the first and second peak values P1 and P2 at step S106. At step S106, a value obtained by subtracting the second peak value P2 from the first peak value P1 is set to 500000, and the frequency difference result is 0.2 obtained by dividing the subtracted value by the second peak value P2.

At step S108, the control value extractor 60 checks whether the frequency difference generated at step 106 exceeds a first threshold value. At step S108, the frequency difference is set lower than the first threshold value of 0.5. If the frequency difference is set lower than the first threshold value at step S108, then the control value extractor 60 generates a slope between the first and second peak values P1 and P2 at step S110. The slope is determined by dividing a variation amount along the vertical axis by a variation amount along the horizontal axis. In FIG. 7B, the vertical axis variation amount of the first and second peak values P1 and P2 is set to 50000 while the horizontal axis variation amount thereof is set to 10. Thus, the slope is set to 5000 at step 110.

At step S112, the control value extractor 60 checks whether the slope generated at step S110 exceeds the second threshold value. Herein, the second threshold value is determined to be in the thousands, for example, a value between 1000 and 9999. More specifically, the second threshold value is indicative of whether the first peak value P1 is close to the second peak value P2. Experimentally, if the first and second peak values P1 and P2 have thousands of value, then the peak value P1 and the second peak value P2 are positioned in such a manner to be close to each other from the histogram. In reality, the second threshold value is determined differently, for example in accordance with the resolution of the liquid crystal display panel 22. Hereinafter, a description will be made, assuming that the second threshold value should be 1000, for explanatory purposes.

Since a generated value of the slope has been set higher than the second threshold value at step S112, the control value extractor 60 determines the control value to be 100, which is a gray level value of the first peak value P1 at step S126. Experimentally, if the slope between the first and second peak values P1 and P2 exceeds the second threshold value, then most brightness components are adjacent to the first peak value P1. Thus, the control value extractor 60 determines the control value to be 100, which is a gray level value of the first peak value P1 when the slope between the first and second peak values P1 and P2 exceeds the second threshold value.

Thereafter, the control value determined at step S126 is applied to the back light controller 64 and the data controller 58. The back light controller 64 generates a brightness control signal Dimming such that a light having brightness corresponding to the control value input thereto can be produced. The data controller 58 generates the modulated brightness components YM such that a contrast ratio can be improved with reference to the control value.

Hereinafter, an explanation as to still another embodiment of the present invention will be made with reference to FIG. 6 and FIG. 7C. Referring to FIG. 6 and FIG. 7C, firstly, at step S100, a histogram as shown in FIG. 7C is generated by the histogram analyzer 56 (for example, when the moon rises over the dark background). If the histogram has been generated at step 100, then the control value extractor 60 extracts a first peak value P1 and a second peak value P2 from the histogram at steps S102 and S104. In FIG. 7C, the first peak value P1 is selected as 200000. The second peak value P2 is selected as 150000.

After having detected the first and second peak values P1 and P2 at steps S102 and S104, the control value extractor 60 calculates a frequency difference between the first and second peak values P1 and P2 at step S106. At step S106, a value obtained by subtracting the second peak value P2 from the first peak value P1 is set to 50000. The corresponding frequency difference is approximately 0.33 obtained by dividing the subtracted value by the second peak value P2.

At step S108, the control value extractor 60 checks whether the frequency difference generated at step 106 exceeds a first threshold value. At step S108, the frequency difference is set lower than the first threshold value, which is 0.5. If the frequency difference is lower than the first threshold value at step S108, then the control value extractor 60 generates a slope between the first and second peak values P1 and P2 at step S110. In FIG. 7C, the vertical axis variation amount of the first and second peak values P1 and P2 is set to 50000 while the horizontal axis variation amount thereof is set to 180. Thus, the slope is approximately 278 at step 110.

At step S112, the control value extractor 60 checks whether the slope generated at step S110 exceeds the second threshold value. Herein, the slope of 278 calculated at step S112 is lower than the second threshold value. If the frequency difference is lower than the second threshold value, then the control value extractor 60 detects a third peak value P3 (i.e., j=3) having the frequency of occurrence next to the second peak value P2 at step S114.

At step S116, after having detected the third peak value P3, the control value extractor 60 checks whether a repetition round of steps S114 to S120 exceeds a third threshold value. Herein, the third threshold value is a value representing the maximum number of repetitions for steps S114 to S120, and is set lower than the total number of gray levels in the horizontal axis of the histogram, for example, a value of 253 or less. More specifically, since the histogram, as shown in FIG. 7C, has gray levels of 0 to 255, the maximum number of peak values to be obtained from the histogram is set to 256. Herein, since the first to third peak values P1 to P3 have been detected prior to step S114, the maximum repetition round of steps S114 to S120 is determined to be 253 or less. Thus, the third threshold value is determined to be a value between 1 and 253.

If the repetition round is less than the third threshold value at step S116, then the control value extractor 60 generates a frequency difference between a peak value generated at step S114 (i.e., the third peak value P3) and the second peak value P2. At step S118, a value obtained by subtracting the third peak value P3 from the second peak value P2 is set to 20000, and the corresponding frequency difference is approximately 0.15 obtained by dividing the subtracted value of 20000 by the third peak value P3. Herein, the second peak value P2 may be replaced by the first peak value P1 at step S118.

At step S120, the control value extractor 60 checks whether the frequency difference generated at step S118 exceeds the first threshold value. If the frequency difference is smaller than the first threshold value at step S120, then steps S114 to S120 are repeated. Meanwhile, the control value extractor 60 detects a peak value one level lower than the peak value detected at the previous step at step S114. In other words, if the third peak value P3 has been detected at the previous step, then the control value extractor 60 detects a fourth peak value P4 having the frequency of occurrence one level lower than the third peak value P3 to thereby repeat steps S116 to S120.

The control value extractor 60 repeats steps S114 to S120 at a predetermined round to obtain a sixth peak value P6, and, if the sixth peak value P6 is lower than the first threshold value, detects a seventh peak value P7 at step S114. The control value extractor 60 having detected the seventh peak value P7 generates a frequency difference between the seventh peak value P7 and the second peak value P2 (or the first peak value P1) at step S118. At step S118, a value obtained by subtracting the seventh peak value P7 from the second peak value P2 is set to 100000, and the frequency difference is given to approximately 2 by dividing the subtracted value by the third peak value P3.

After obtaining the frequency difference of 2 at step S118, the control value extractor 60 checks at step S120 whether the frequency difference exceeds the first threshold value. If the frequency difference is larger than the first threshold value, then the control value extractor 60 obtains a slope between the first peak value P1 and the seventh peak value P7 and a slope between the second peak value P3 and the seventh peak value P7 at step S124. At step S124, the slope between the first peak value P1 and the seventh peak value P7 is 973.5 while the slope between the second peak value P2 and the seventh peak value P7 is 5000.

Subsequently, the control value extractor 60 compares the magnitudes of the slopes obtained at step S124 to determine a peak value having a larger slope to be a control value. Herein, since the slope between the second peak value P2 and the seventh peak value P7 is larger than the slope between the first peak value P1 and the seventh peak value P7, a gray level value of the second peak value P2, which is 20, is determined to be a control value. In other words, the control value extractor 60 selects a gray level value of the second peak value P2 as a control value because the seventh peak value P7 is positioned in such a manner to be close to the second peak value P2. Herein, if the slope between the seventh peak value P7 and the first peak value P1 is larger than the slope between the seventh peak value P7 and the second peak value P2, then a gray level of the first peak value P1 is selected as the control value.

The control value determined at step S126 is applied to the back light controller 64 and the data controller 58. The back light controller 64 generates a brightness control signal Dimming such that a light having brightness corresponding to the control value input thereto can be produced. The data controller 58 generates the modulated brightness components YM such that a contrast ratio is improved with reference to the control value.

In embodiments of the present invention, if the repetition round of steps S114 to S120 exceeds the third threshold value, then the control value extractor 60 selects an average value as a control value at step S126. In other words, in the above-mentioned embodiment of the present invention, if a desired peak value is not selected at steps S100 to S120, then a gray level value of the average value of the histogram is selected as a control value. Thus, when brightness is distributed evenly at a whole area, the average value is selected as a control value.

Alternatively, in another embodiment of the present invention, if the repetition round of steps S114 to S120 exceeds the third threshold value, then control value extractor 60 can set a data and brightness of the back light in the same method as the related art. In other words, in another embodiment of the present invention, if a desired peak value is not selected at steps S100 to S120, then the brightness of the back light is controlled similarly with the related art (i.e., a predetermined brightness). In this case, a contrast of the data may be not expanded.

The inverter 36 controls the back light 38 such that a light corresponding to the brightness control signal Dimming supplied from the back light controller 64 is applied to the liquid crystal display panel 22. In other words, in embodiments of the present invention, the second data Ro, Go and Bo having an expanded contrast are produced in correspondence with the brightness components Y for one frame of the externally provided first data Ri, Gi and Bi, thereby displaying a vivid image. Furthermore, the brightness of the back light 38 is controlled in accordance with the brightness components Y for one frame of the first data Ri, Gi and Bi, thereby displaying a vivid image. Moreover, in embodiments of the present invention, the control value is extracted from an area at which a lot of brightness is distributed, so that it becomes possible to prevent a high brightness from being displayed on the dark field or to prevent a low brightness from being displayed within the bright field.

As described above, according to various embodiments of the present invention, the brightness components are extracted from the first data and the second data having an expanded contrast are produced using the extracted brightness components, thereby displaying a vivid image. Furthermore, the brightness of the back light is controlled by the brightness components extracted from the first data, thereby displaying a vivid image. Moreover, according to the various embodiments of the present invention, a peak value where brightness components are concentrated in distribution is set to a control value determining a brightness characteristic of the back light, so that it becomes possible to prevent a high brightness from being displayed in the dark field.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. A method of driving a liquid crystal display, comprising:

- arranging an externally provided first data into a histogram for each frame;
- producing a second data having an expanded contrast using the histogram;
- determining a control value by extracting a peak value at a position where brightness components are concentrated in a distribution; and
- controlling a brightness of a back light in accordance with a gray level of the control value.

2. The method of claim 1, wherein determining the control value includes:

- extracting a first peak value having the highest frequency of occurrence from the histogram;
- extracting a second peak value having the second highest frequency of occurrence from the histogram;
- detecting a frequency difference representing a difference in the frequency of occurrence between the first peak value and the second peak value; and specifying the control value as a gray level of the first peak value when the frequency difference exceeds a first threshold value.

3. The method of claim 2, wherein detecting the frequency difference includes dividing a value obtained by subtracting the second peak value from the first peak value by the second peak value.

4. The method of claim 2, wherein detecting the frequency difference includes subtracting a peak value having a low frequency of occurrence from a peak value having a high frequency of occurrence and dividing the subtracted value by the peak value having the low frequency of occurrence.

5. The method of claim 2, wherein the first threshold value is 0.5 or more.

6. The method of claim 2, further comprising:

detecting a slope between the first peak value and the second peak value when the frequency difference is lower than the first threshold value; and specifying the control value as the gray level of the first peak value when the slope exceeds a second threshold value.

7. The method of claim 6, wherein detecting the slope includes dividing a variation amount in the frequency of occurrence corresponding to the vertical axis of the histogram by a variation amount in the gray level corresponding to the horizontal axis of the histogram.

8. The method of claim 6, wherein the second threshold value is in a range from 1000 to 9999.

9. The method of claim 6, further comprising:

a modified peak detection step of detecting a modified peak value having the frequency of occurrence next to the second peak value when the slope is lower than the second threshold value;

a modified frequency detection step of detecting a modified frequency difference between the modified peak value and the second peak value; and a modified decision step of determining whether the frequency difference exceeds the first threshold value.

10. The method of claim 9, wherein the modified peak detection step, the modified frequency detection step and the modified decision step are repeated when the modified frequency difference is lower than the first threshold value at the modified decision step.

11. The method of claim 10, further including:

changing the modified peak value into a peak value having a frequency of occurrence next to the frequency of occurrence of the modified peak value extracted at the modified peak detection step; and repeating the modified peak detection step, the modified frequency detection step and the modified decision step.

12. The method of claim 9, wherein the modified frequency difference exceeds the first threshold value at the third step, further comprising:

detecting a first slope between the modified frequency difference and the first peak value when;

detecting a second slope between the modified frequency difference and the second peak value; and determining a magnitude of each of the first and second slopes.

13. The method of claim 12, wherein the first slope is larger, and the gray level of the first peak value is set to the control value.

14. The method of claim 12, wherein the second slope is larger, and the gray level of the second peak value is set to the control value.

15. The method of claim 10, further comprising:

checking a repetition round of the modified peak detection step, the modified frequency detection step and the modified decision step; and checking whether the repetition round is lower than a third threshold value.

16. The method of claim 15, wherein the third threshold value is lower than a total gray level number in the horizontal axis of the histogram.

17. The method of claim 16, wherein the third threshold value is 253 or less.

18. The method of claim 15, wherein the repetition round exceeds the third threshold value, and an average value of the histogram is set to the control value.

19. The method of claim 15, wherein the repetition round exceeds the third threshold value, and the brightness of the back light is controlled such that a predetermined brightness of light can be provided.

20. A method of driving a liquid crystal display, comprising:

arranging externally provided data into a histogram for each frame;

determining a control value which includes extracting a peak value at a position where brightness components are concentrated in a distribution; and controlling a brightness of a back light in accordance with a gray level of the control value.

21. The method of claim 20, wherein the step of determining a control value includes:

extracting a first peak value having the highest frequency of occurrence from the histogram;

extracting a second peak value having the second highest frequency of occurrence from the histogram;

detecting a frequency difference representing a difference in the frequency of occurrence between the first peak value and the second peak value; and specifying the control value as a gray level of the first peak value when the frequency difference exceeds a first threshold value.

22. The method of claim 21, wherein detecting the frequency difference includes subtracting a peak value having a low frequency of occurrence from a peak value having a high frequency of occurrence and dividing the subtracted value by the peak value having the low frequency of occurrence.

23. The method of claim 21, wherein the first threshold value is 0.5 or more.

24. The method of claim 21, further comprising:

detecting a slope between the first peak value and the second peak value when the frequency difference is lower than the first threshold value; and setting the control value as the gray level of the first peak value when the slope exceeds a predetermined second threshold value.

25. The method of claim 24, wherein the second threshold value is in the range from 1000 to 9999.

26. The method of claim 24, further comprising:

detecting a modified peak value having the frequency of occurrence next to the second peak value when the slope is lower than the second threshold value;

generating a modified frequency difference between the modified peak value and the second peak value; and determining whether the frequency difference exceeds the first threshold value.

27. The method of claim 26, wherein the modified frequency difference exceeds the first threshold value, further comprising:

detecting a first slope between the modified frequency difference and the first peak value when;

detecting a second slope between the modified frequency difference and the second peak value; and determining a magnitude of each of the first and second slopes.

28. The method of claim 27, wherein the first slope is larger, and the gray level of the first peak value is set to the control value.

29. The method of claim 27, wherein the second slope is larger, and the gray level of the second peak value is set to the control value.

30. A driving apparatus for a liquid crystal display, comprising:

a brightness/color separator that extracts brightness components from a first data;

a histogram analyzer that converts the brightness components into a histogram for each frame;

a data processor that produces a second data having an expanded contrast using the histogram;

a control value extractor that extracts as a control value a peak value at a central part of the histogram; and a back light controller that controls brightness of a back light in response to the control value.

* * * * *